United States Patent [19]
Stanaback

[11] 4,052,546
[45] Oct. 4, 1977

[54] PROCESS FOR THE PRODUCTION OF VINYL HALIDE POLYMERS

[75] Inventor: Robert J. Stanaback, Gladstone, N.J.

[73] Assignee: Tenneco Chemicals, Inc., Saddle Brook, N.J.

[21] Appl. No.: 736,920

[22] Filed: Oct. 29, 1976

[51] Int. Cl.² .............................................. C08F 14/06
[52] U.S. Cl. .................................. 526/206; 526/294; 526/330; 526/344; 526/345
[58] Field of Search ............... 526/345, 294, 206, 330, 526/344

[56] References Cited
U.S. PATENT DOCUMENTS

| | | | |
|---|---|---|---|
| 2,964,508 | 12/1960 | Rector et al. | 526/343 |
| 3,745,192 | 7/1973 | Wingler et al. | 526/206 |
| 3,770,810 | 11/1973 | Dixon | 526/206 |
| 3,953,409 | 4/1976 | Komatsu et al. | 526/294 |

Primary Examiner—Harry Wong, Jr.
Attorney, Agent, or Firm—Evelyn Berlow

[57] ABSTRACT

Vinyl halide polymers of relatively low molecular weight are obtained when a monomer component comprising a vinyl halide is polymerized in the presence of a free radical generating polymerization initiator and a molecular weight regulating agent that is a polybromobutene, such as 1,1,2,4-tetrabromobutene-2. The products have low melt viscosity and excellent fusion characteristics that make them valuable in molding, extrusion, and coating applications.

7 Claims, No Drawings

PROCESS FOR THE PRODUCTION OF VINYL HALIDE POLYMERS

This invention relates to a process for the production of vinyl halide polymers. More particularly, it relates to a process for the production of vinyl halide polymers having lower molecular weights and melt viscosities than the corresponding polymers prepared at the same temperatures but using previously-known processes.

When vinyl chloride or another vinyl halide is polymerized in an aqueous medium in the presence of a free radical generating polymerization initiator, the products are usually high molecular weight polymers that have relatively high melt viscosities. These high molecular weight polymers have the disadvantage of being difficult to process without the use of special processing equipment except at temperatures that are so high that they have a detrimental effect on the color and other physical properties of the processed polymers.

Various techniques have been proposed for regulating the molecular weights of vinyl halide polymers so as to make them more easily processable. One such technique involves carrying out the polymerization in an organic diluent. While this is an effective means of lowering the molecular weight and melt viscosity of the polymers, it has the disadvantages of increased cost and inconvenience in separating the polymers from the organic diluent. In another proposed technique, the polymerization is conducted at an elevated temperature. This procedure, which increases the possibility of an uncontrollable or violent polymerization reaction, often results in thermal degradation of the products. Alternatively, polymers of relatively low molecular weight can be prepared by carrying out the polymerization in the presence of a molecular weight regulating agent, the most widely-used of which are halogenated hydrocarbons, such as carbon tetrachloride, chloroform, bromoform, methylene chloride, dichlorodibromomethane, monochlorotribromomethane, 1,2-dibromo-1,1,2-trichloroethane, dichloroethylene, trichloroethylene, perchloroethylene, and hexachloroethane. Some of these molecular weight regulating agents are known to retard the polymerization reaction, while others may require reaction temperatures that are almost as high as those of the aforementioned high temperature procedures for regulating molecular weights of polymers. When they are used as molecular weight regulating agents, the halogenated methanes, ethanes, and ethylenes enter into the polymerization reaction and appear as components of the finished polymers. Small amounts of these compounds remain unreacted, however, and are usually present in the products. In view of the volatility of these compounds and the known toxicity of some of them, for example, trichloroethylene and chloroform, the presence of residual halohydrocarbon in the polymer may cause health hazards in the areas in which the polymers are produced and processed. It would therefore be advantageous to those who work with vinyl halide resins to have available molecular weight regulating agents that are relatively non-volatile and non-toxic and that do not retard the polymerization or require the use of polymerization conditions that result in discoloration or degradation of the polymer.

In accordance with this invention, it has been found that when a monomer component that comprises a vinyl halide is polymerized in an aqueous medium in the presence of a free radical generating polymerization initiator and a molecular weight regulating agent that is a polybromobutene, the vinyl halide polymers obtained have substantially lower molecular weights and melt viscosities than the corresponding polymers prepared at the same temperature but using other molecular weight regulating agents.

The polymers that are prepared by the process of this invention can be readily fused, extruded, or molded in conventional processing equipment without requiring the use of the elevated temperatures that have a deleterious effect on polymer strength and color. The novel process is particularly advantageous in that it accomplishes molecular weight reduction without use of the halogenated methanes, ethanes, and ethylenes or other volatile molecular weight regulating agents that cause pollution problems in the work areas in which the polymers are produced and processed.

The polybromobutenes that are used as the molecular weight regulating agent in the process of this invention have the general formula $C_4Br_nH_{6-n}$, wherein $n$ represents a number in the range of 4 to 8. Illustrative of these compounds are the following:

1,1,2,4-tetrabromobutene-2,
1,3,4,4-tetrabromobutene-1,
2,3,4,4-tetrabromobutene-1,
1,1,1,4,4-pentabromobutene-2,
1,1,2,3,4,4-hexabromobutene-2,
octabromobutene-1, and octabromobutene-2.

It is preferred that the molecular weight regulating agent be a polybromobutene-2 having the structural formula

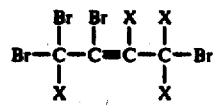

wherein each X represents Br or H. 1,1,2,4-Tetrabromobutene-2 and 1,1,2,3,4,4-hexabromobutene-2 have combinations of properties that make them particularly valuable as molecular weight regulating agents in the polymerization of vinyl halides. In addition to providing the desired reduction in the molecular weight and melt viscosity of the polymers, these compounds are non-volatile, stable, and odorless materials that have been shown to be non-toxic, non-irritating, and biodegradable.

1,1,2,4-Tetrabromobutene-2 and 1,1,2,3,4,4-hexabromobutene-2 can be prepared readily in good yield by the bromination of diacetylene. This reaction can be carried out safely by contacting a gas stream that contains 20 to 50 mole percent of diacetylene in an inert gas, such as nitrogen, with a dilute solution of bromine in water or carbon tetrachloride. The product of this reaction is a mixture of polybrominated compounds that contains 75 to 80 percent by weight of 1,1,2,3,4,4-hexabromobutene-2, 15 to 23 percent by weight of 1,1,2,4-tetrabromobutene-2, and small amounts of dibromobutadienes. The crystalline hexabromobutene-2 may be separated from the product mixture by filtration. The filtrate, which is a clear oil with a specific gravity of 2.54, consists principally of tetrabromobutenes. It usually contains at least 60 percent of cis and trans 1,1,2,4-tetrabromobutene-2 and up to 40 percent of other tetrabromobutene-2 isomers. In most cases, the oil contains 75% or more cis and trans 1,1,2,4-tetrabromobutene-2. This tetrabromobutene oil is an odorless liquid that has a bromine content of about 85 percent and that boils at a temperature above 300° C. at 760 mm. and at 95° C. at 0.2 mm. The hexabromobutene-2 that is separated from the brominated product mixture contains about 85 to 95 percent of trans 1,1,2,3,4,4-hexabromobutene-2 and 5 to 15 percent of the cis isomer. This mixture is a crystalline material that melts at about 180° C. and that contains 90 percent of bromine. This cis and trans isomers of 1,1,2,4-tetrabromobutene-2 and of 1,1,2,3,4,4-hexabromobutene-2 can be separated and used individually in the process of this invention. For reasons of economy and performance, however, it is generally preferred that mixtures of the cis and trans isomers be used.

A single polybromobutene or a mixture of two or more of these compounds can be used to control the molecular weight of vinyl halide polymers.

The amount of polybromobutene that is used in the process of this invention to control the molecular weight of vinyl halide polymers is usually between 0.05 percent and 2.0 percent by weight, based on the weight of the monomer component of the polymerization mixture. Optimum results have been obtained when 0.1 percent to 1.0 percent by weight of polybromobutene, based on the weight of the monomer component, was used. When less then 0.05 percent by weight, based on the weight of the monomer component, is used, there is often insufficient reduction in the molecular weight of the polymer; when more than 2.0 percent by weight is used, no additional benefits are realized. When the indicated amount of polybromobutene is used, a substantial reduction in the molecular weight and melt viscosity of the vinyl halide polymer is effected without the necessity of altering polymerization conditions and without a significant decrease in the rate of polymerization.

The process of this invention may be used in the production of vinyl halide homopolymers as well as polymers formed by the copolymerization of a vinyl halide with a water-insoluble ethylenically-unsaturated monomer that is copolymerizable therewith. The vinyl halide is ordinarily and preferably vinyl chloride, but the bromide, fluroide, and iodide can also be used. Suitable comonomers include vinyl acetate, vinyl propionate, vinyl stearate, vinyl benzoate, ethylene, propylene, methyl methacrylate, ethyl acrylate, allyl acrylate, acrylamide, acrylonitrile, methacrylonitrile, vinylidene chloride, vinyl ethers, dialkyl fumarates, and maleates, and the like. When one or more of the aforementioned comonomers are used, the monomer component contains at least 70 percent by weight of the vinyl halide. It is preferred that the monomer component consist essentially of vinyl chloride or that it contain about 80 percent to 90 percent by weight of vinyl chloride and 10 percent to 20 percent by weight of vinyl acetate.

The polymerization reactions of this invention are carried out in the conventional manner using the well-known emulsion or suspension polymerization techniques. In the suspension polymerization process, a vinyl halide or a mixture of a vinyl halide with at least one comonomer is suspended in water by the use of suspending agents and agitation. The polymerization is started by means of a free radical generating polymerization initiator, such as lauroyl peroxide, benzoyl peroxide, diisopropyl peroxydicarbonate, tertiary butyl peroxypivalate, azobisisobutyronitrile, azobis-2,4-dimethylvaleronitrile, combinations of dialkyl peroxydicarbonates and lauroyl peroxide, sulfonyl peroxides and the like. Suspending agents such as methylcellulose, hydroxymethylcellulose, hydroxyethylcellulose, hydroxypropylmethylcellulose, hydrolyzed polyvinyl acetate, gelatin, methyl vinyl ether-maleic anhydride copolymers and combinations of the above are included in the reaction mixture. In the emulsion polymerization process, vinyl halide homopolymers and copolymers are prepared using such initiators as hydrogen peroxide, organic peroxides, persulfates, and redox systems and such surface-active agents as alkyl sulfates, alkane sulfonates, alkylaryl sulfonates, and fatty acid soaps. The polymerization is usually carried out at a temperature in the range of 40° to 80° C. The polymers that are produced may be separated and dried by spray-, drum-, or tray-drying techniques.

Polybromobutene may be added to the polymerization mixture before the polymerization reaction is begun, or it may be added incrementally or continuously during the course of the reaction.

The relative viscosity of a vinyl halide polymer is generally taken as being indicative of its molecular weight since the relative viscosity decreases with decreasing molecular weight. Relative viscosity, which is the ratio of the viscosity of a solution of the polymer to that of the solvent, is usually measured using a 1% solution of the polymer in cyclohexanone at 25° C. in a Canon-Fenske Viscometer. The invention is further illustrated by the following examples.

EXAMPLES

A series of polymers was prepared by heating and stirring the polymerization systems set forth in the following Table in an autoclave at 65° C. for 18 hours. The polymers were separated by filtration and air dried at 45° C. The degrees of polymerization of the monomer components and the relative viscosities of the polymers are set forth in the Table.

Table

| Polymerization System | Example | | Comparative Example | | | | | |
|---|---|---|---|---|---|---|---|---|
| (Parts by Weight) | 1 | 2 | A | B | C | D | E | F |
| Vinyl Chloride | 85 | 85 | 85 | 85 | 85 | 85 | 85 | 85 |
| Vinyl Acetate | 15 | 15 | 15 | 15 | 15 | 15 | 15 | 15 |
| Deionized Water | 185 | 185 | 185 | 185 | 185 | 185 | 185 | 185 |
| Lauroyl Peroxide | 0.125 | 0.125 | 0.125 | 0.125 | 0.125 | 0.125 | 0.125 | 0.125 |
| Gelatin | 1.75 | 1.75 | 1.75 | 1.75 | 1.75 | 1.75 | 1.75 | 1.75 |
| 1,1,2,3,4,4-Hexabromo-Butene-2 | 0.69 | — | — | — | — | — | — | — |
| 1,1,2,4-Tetrabromo-Butene-2 | — | 0.69 | — | — | — | — | — | — |
| Dibromodichloromethane | — | — | 0.69 | — | — | — | — | — |
| Trichlorobromomethane | — | — | — | 0.69 | — | — | — | — |
| 1,1,1-Trichloroethane | — | — | — | — | 0.69 | — | — | — |
| 1,1,2-Tribromoethane | — | — | — | — | — | 0.69 | — | — |
| Hexabromoethane | — | — | — | — | — | — | 0.69 | — |
| Degree of Conversion (%) | 94.0 | 95.0 | 93.8 | 94.2 | 93.3 | 94.0 | 95.0 | 93.8 |
| Relative Viscosity | 1.55 | 1.52 | 1.64 | 1.63 | 1.76 | 1.70 | 1.67 | 1.75 |

(1% solution of the polymer in cyclohexanone at 25° C.)

From the data in the Table, it will be seen that the polybrominated butenes of Examples 1 and 2 provided a greater reduction in the relative viscosity of the vinyl chloride-vinyl acetate copolymer than did the molecular weight regulating agents of Comparative Examples A-E, all of which have been widely used in the production of vinyl chloride homopolymers and copolymers. None of the molecular weight regulating agents had an appreciable adverse effect on the degree of conversion of the monomers to polymers.

Each of the other polybromobutenes disclosed herein can be used in a similar manner to control the molecular weight of vinyl halide polymers.

What is claimed is:

1. In the process for the polymerization of a monomer component selected from the group consisting of vinyl halides and mixtures of vinyl halides with at least one ethylenically-unsaturated monomer that is copolymerizable therewith, said mixtures containing at least 70% by weight of the vinyl halide, in an aqueous medium at a temperature in the range of 40° to 80° C. in the presence of a free radical generating polymerization initiator, the improvement that consists of conducting the polymerization in the presence of from 0.05 percent to 2.0 percent by weight, based on the weight of the monomer component, of a polybromobutene having the formula $C_4Br_nH_{8-n}$, wherein $n$ represents a number in the range of 4 to 8.

2. The process of claim 1 wherein the polybromobutene is a compound having the structural formula

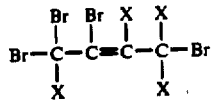

wherein each X represents Br or H.

3. The process of claim 1 wherein the polybromobutene is 1,1,2,4-tetrabromobutene-2.

4. The process of claim 1 wherein the polybromobutene is 1,1,2,3,4,4-hexabromobutene-2.

5. The process of claim 1 wherein the polymerization is conducted in the presence of from 0.1 percent to 1.0 percent, based on the weight of the monomer component, of a polybromobutene.

6. The process of claim 1 wherein the monomer component consists essentially of vinyl chloride.

7. The process of claim 1 wherein the monomer component contains 80 percent to 90 percent by weight of vinyl chloride and 10 percent to 20 percent by weight of vinyl acetate.

* * * * *